(12) United States Patent
Gurkaynak et al.

(10) Patent No.: US 6,673,261 B1
(45) Date of Patent: Jan. 6, 2004

(54) DEICING COMPOSITION

(75) Inventors: Mehmet Ali Gurkaynak, Bostanci-Istanbul (TR); Ahmet Atilla Kimyacioglu, Erenkov-Istanbul (TR); Isa Uzun, Gemlik-Bursa (TR)

(73) Assignee: MKS Marmara Entegra Kimya San, A.S., Istanbul (TR)

( * ) Notice: Subject to any disclaimer, the term of this patent is extended or adjusted under 35 U.S.C. 154(b) by 0 days.

(21) Appl. No.: 10/331,402

(22) Filed: Dec. 30, 2002

(30) Foreign Application Priority Data

Oct. 16, 2001 (WO) ................................ PCT/TR01/00051

(51) Int. Cl.$^7$ .................................................. C09K 3/18
(52) U.S. Cl. .......................................... 252/70; 106/13
(58) Field of Search ............................... 252/70; 106/13

(56) References Cited

U.S. PATENT DOCUMENTS

| | | | |
|---|---|---|---|
| 5,350,533 A | 9/1994 | Hubred et al. ............... | 252/70 |
| 5,730,895 A * | 3/1998 | Moore ......................... | 252/70 |
| 5,922,241 A * | 7/1999 | Becker et al. ................ | 252/70 |
| 5,993,684 A * | 11/1999 | Back et al. ................... | 252/70 |
| 6,059,989 A | 5/2000 | Stankowiak et al. .......... | 252/70 |
| 6,149,833 A | 11/2000 | Dietl et al. ................... | 252/70 |
| 6,156,226 A | 12/2000 | Klyosov et al. .............. | 252/70 |

FOREIGN PATENT DOCUMENTS

EP 0375 214 A1 6/1990 ............ C09K/3/18

* cited by examiner

Primary Examiner—Anthony J. Green
(74) Attorney, Agent, or Firm—Duke W. Yee; Stephen R. Tkacs

(57) ABSTRACT

The present invention provides a simpler, readily-prepared, and non corrosive deicing composition with very low environmental impact, especially for airport runways, highways and roads, which comprises a solid mixture of a) from 97.30 to 97.70% by weight alkali metal salt of formic acid and b) from 2.30 to 2.70% by weight an alkali metal silicate as the corrosion inhibitor. This effective deicer which is employed in solid form (powder, granules and the like), ensures the compliance with AMS1431 B at the same time it is environmentally friendly with its low BOD and COD.

18 Claims, No Drawings

DEICING COMPOSITION

BACKGROUND OF THE INVENTION

1. Technical Field

The present invention is related to a deicing composition and a method of using thereof, especially for aircraft runways and roads. In particular, the invention is related to a deicing composition comprising alkali metal salt of formic acid and an alkali metal silicate as the corrosion inhibitor.

2. Description of Related Art

In winter, snow and especially ice on the roads, highways, taxiways and runways make to lessen the traction and become the main source of danger and accidents thereof. The removal of snow or ice from such surfaces, is of great importance which will ensure safe traffic movements. The most efficient and known method of striving against the problem is to melt the ice by chemical salts which are currently applied to traffic areas in extensive amounts.

For deicing purposes, there have been conventionally described numerous alkali and alkaline earth metal salts of inorganic and organic acids and some organic compounds like urea as well, but in general, there are two essential drawbacks of deicer compounds to be forestalled, their corrosive action on metals especially on light metals such as aluminum or magnesium and their environmental impact. That is, together with the efficacy, deicers should also be unobjectionable in terms of corrosiveness and ecological and physiological effects. These can be significantly ruled out by combination of more environmentally benign chemical salts with suitable corrosion inhibitor(s).

In view of these requirements, the recent deicers revealed in the prior art as being advantageous are mainly alkali metal salts of organic acids as formates and acetates combined with specific corrosion inhibitors, comprising relatively complex mixtures, where these compositions should also exhibit low BOD and COD. Therefore, in the mitigation of above problems, the selection of the chemical salts and inhibitor(s) gains a greater importance.

SUMMARY OF THE INVENTION

It is, therefore, an object of the invention to obviate the disadvantages of the prior art.

Yet another object is, to provide a simpler, readily-prepared, and non corrosive deicer composition with very low environmental impact, for airport runways, highways and roads.

It has now been surprisingly found that a simplified composition, comprising at very specific combination of an alkali metal salt of formic acid as main ingredient and alkali metal silicate as the corrosion inhibitor in a very specific proportions, makes a novel and environmentally more preferred deicer (featuring a complete compliance with American Military Standards AMS 1431B).

The present innovation provides a novel and simpler deicing composition without requiring many additives or complex mixtures, which is a deicer for aircraft runways and roads. The said deicing composition comprises essentially a) from 97.30 to 97.70% by weight of alkali metal salt of formic acid and b) from 2.30 to 2.70% by weight of an alkali metal silicate as the corrosion inhibitor.

Component a) is an alkali metal formate. The alkali metal is preferably sodium. Accordingly, component a) is sodium formate (Industrial Grade: Assay min. 97%, the rest is pentaerythritols) which is much better than acetates in terms of BOD and COD.

Component b) is a water soluble alkali metal silicate, the alkali metal again being preferably sodium.

The novel and preferred deicing composition is prepared by mixing together the liquid or solid components. The deicing composition can be applied to the traffic areas in the customary manner, such as, spreading as solid powder or as granules of 2–4 mm in diameter or the like.

DETAILED DESCRIPTION OF THE INVENTION

The invention will be further described with reference to the following two novel Examples and two comparison Examples.

EXAMPLES

The deicing compositions were prepared as powder by mixing powder ingredients and the percentages given for the individual components are percentages by weight. The deicing compositions of Examples 1 to 4 were tested for corrosion according to American Military Standards AMS 1431B which covers ASTM (American Society for Testing and Materials) corrosion tests; Sandwich Corrosion (ASTM F1110), Total Immersion Corrosion (ASTM F483), Low-Embrittling Cadmium Plate (ASTM F1111), Hydrogen Embrittlement (ASTM F519 type 1a, 1c or 2a) and Stress-Corrosion Resistance (ASTM F945) besides the tests such as Effect on Unpainted Surfaces (ASTM F485), Effect on Painted Surfaces (ASTM F502), Effect on Transparent Plastics (ASTM F484) and Runway Concrete Scaling Resistance (ASTM C672). The tests were carried out by SMI Inc. Florida, which is one of the very well known independent laboratory in runway/taxiway deicer testing.

For comparison, compositions were tested according to Total Immersion Corrosion Test specified in ASTM F483 using three replicate specimens (test panels) for each alloy having total surface area of 28.2 $cm^2$ and subsequently preferred deicer composition was completely tested according to AMS 1431B.

Example 1

| | |
|---|---|
| sodium formate | 98.0% |
| sodium metasilicate | 2.0% |

Total Immersion Corrosion: The composition, tested in accordance with ASTM F483, except that panels shall be AMS 4376 tested for 24 hours, shall neither cause corrosion of test panels nor a weight change of any test panel greater than shown in the table.

| | Weight Loss mg/$cm^2$/24 hrs | | |
|---|---|---|---|
| ALLOY | Allowed | 5% | 15% |
| AMS 4037 Aluminum anodized per AMS 2470 | 0.3 | +0.02 | +0.15** |
| AMS 4041 Aluminum | 0.3 | <0.01 | +0.01 |
| AMS 4049 Aluminum | 0.3 | <0.01 | <0.01 |
| AMS 4376 Magnesium, dichromate (AMS 2475) | 0.2 | 0.18* | 0.06* |

Example 2 -continued

| ALLOY | Weight Loss mg/cm²/24 hrs | | |
|---|---|---|---|
| | Allowed | 5% | 15% |
| AMS 4911 Titanium | 0.1 | <0.01 | <0.01 |
| AMS 5045 Carbon Steel | 0.8 | <0.01 | <0.01 |

*severe corrosion
**discolored
Result: <u>Does not conform</u>

Example 2

| sodium formate | 97.5% |
|---|---|
| sodium metasilicate | 2.5% |

Total Immersion Corrosion: The composition, tested in accordance with ASTM F483, except that panels shall be AMS 4376 tested for 24 hours, shall neither cause corrosion of test panels nor a weight change of any test panel greater than shown in the table.

| ALLOY | Weight Loss mg/cm²/24 hrs | | |
|---|---|---|---|
| | Allowed | 5% | 15% |
| AMS 4037 Aluminum anodized per AMS 2470 | 0.3 | +0.03 | +0.05 |
| AMS 4041 Aluminum | 0.3 | 0.01 | +0.03 |
| AMS 4049 Aluminum | 0.3 | <0.01 | +0.02 |
| AMS 4376 Magnesium, dichromate (AMS 2475) | 0.2 | 0.08 | 0.09 |
| AMS 4911 Titanium | 0.1 | +0.01 | +0.03 |
| AMS 5045 Carbon Steel | 0.8 | +0.03 | +0.03 |

Result: <u>Conforms</u>

Example 3

| sodium formate | 97.45% |
|---|---|
| sodium metasilicate | 2.55% |

Total Immersion Corrosion: The composition, tested in accordance with ASTM F483, except that panels shall be AMS 4376 tested for 24 hours, shall neither cause corrosion of test panels nor a weight change of any test panel greater than shown in the table.

| ALLOY | Weight Loss mg/cm²/24 hrs | | |
|---|---|---|---|
| | Allowed | 5% | 15% |
| AMS 4037 Aluminum anodized per AMS 2470 | 0.3 | +0.02 | +0.03 |
| AMS 4041 Aluminum | 0.3 | +0.01 | +0.01 |
| AMS 4049 Aluminum | 0.3 | 0.01 | <0.01 |
| AMS 4376 Magnesium, dichromate (AMS 2475) | 0.2 | 0.05 | 0.07 |
| AMS 4911 Titanium | 0.1 | <0.01 | <0.01 |
| AMS 5045 Carbon Steel | 0.8 | <0.01 | +0.01 |

Result: <u>Conforms</u>

Example 4

| sodium formate | 97.0% |
|---|---|
| sodium metasilicate | 3.0% |

Total Immersion Corrosion: The composition, tested in accordance with ASTM F483, except that panels shall be AMS 4376 tested for 24 hours, shall neither cause corrosion of test panels nor a weight change of any test panel greater than shown in the table.

| ALLOY | Weight Loss mg/cm²/24 hrs | | |
|---|---|---|---|
| | Allowed | 5% | 15% |
| AMS 4037 Aluminum anodized per AMS 2470 | 0.3 | +0.02 | +0.01 |
| AMS 4041 Aluminum | 0.3 | +0.01 | +0.01 |
| AMS 4049 Aluminum | 0.3 | <0.01 | <0.01 |
| AMS 4376 Magnesium, dichromate (AMS 2475) | 0.2 | 0.16* | 0.12* |
| AMS 4911 Titanium | 0.1 | <0.01 | <0.01 |
| AMS 5045 Carbon Steel | 0.8 | <0.01 | <0.01 |

*corrosion present
Result: <u>Does not conform</u>

By comparson, Example 2 was selected as preferred composition and fully tested in accordance with AMS 1431B by which a much simpler novel deicing composition with effective anticorrosion properties was approved.

While there have been shown and described what are at present considered the preferred embodiments of the invention, it will be apparent to those skilled in the art that various changes and modifications can be made herein without departing from the scope of the invention as defined by the appended claims.

What is claimed is:

1. A solid deicing composition consisting essentially of:
    a) 97.30 to 97.70% by weight of alkali metal salt of formic acid; and
    b) 2.30 to 2.70% by weight of an alkali metal silicate.
2. A composition according to claim 1, wherein component a) is an alkali metal formate.
3. A composition according to claim 2, wherein the alkali metal is sodium.
4. A composition according to any one of the preceding claims, wherein component a) is sodium formate.
5. A composition according to claim 1, which is in the form of solid powders or granules.
6. A composition according to claim 2, wherein the alkali metal is potassium.
7. A method of deicing airport runways, highways and roads, comprising applying to an ice covered surface thereof a deicer composition consisting essentially to a mixture of 97.30 to 97.70% by weight of alkali metal salt of formic acid and 2.30 to 2.70% by weight of an alkali metal silicate in order to melt ice on the surface.
8. A method according to claim 7, wherein the alkali metal salt of formic acid is sodium formate.
9. A method according to claim 8, wherein the alkali metal silicate is sodium metasilicate.
10. A method according to claim 7, wherein the deicer composition is phosphate free and nitrite free.
11. A solid deicing composition having full compliance with runway deicer standards AMS1431B and AMS1435, the composition consisting essentially of:

c) 97.30 to 97.70% by weight of alkali metal salt of formic acid; and d) 2.30 to 2.70% by weight of an alkali metal silicate.

12. A composition according to claim 11, wherein component a) is an alkali metal formate.

13. A composition according to claim 12, wherein the alkali metal is sodium.

14. A composition according to claim 11, which is in the form of solid powders or granules.

15. A phosphate free solid deicing composition consisting essentially of:

e) 97.30 to 97.70% by weight of alkali metal salt of formic acid; and f) 2.30 to 2.70% by weight of an alkali metal silicate.

16. A composition according to claim 15, wherein component a) is an alkali metal formate.

17. A composition according to claim 16, wherein the alkali metal is sodium.

18. A composition according to claim 15, which is in the form of solid powders or granules.

* * * * *

UNITED STATES PATENT AND TRADEMARK OFFICE
CERTIFICATE OF CORRECTION

PATENT NO.     : 6,673,261 B1                                                      Page 1 of 1
DATED          : January 6, 2004
INVENTOR(S)    : Gurkaynak et al.

It is certified that error appears in the above-identified patent and that said Letters Patent is hereby corrected as shown below:

<u>Title page, Item [54] and Column 1, line 1,</u>
Title, before "DEICING" insert -- NOVEL --.

Signed and Sealed this

Eleventh Day of May, 2004

JON W. DUDAS
*Acting Director of the United States Patent and Trademark Office*